(12) United States Patent
Vinzant

(10) Patent No.: US 9,869,865 B2
(45) Date of Patent: Jan. 16, 2018

(54) HEAD-MOUNTABLE VIEWER WITH ADJUSTABLE LENS

(71) Applicant: Unofficial Cardboard Inc., Menifee, CA (US)

(72) Inventor: David Jess Vinzant, Murrieta, CA (US)

(73) Assignee: UNOFFICIAL CARDBOARD, INC., Deerfield, IL (US)

( * ) Notice: Subject to any disclaimer, the term of this patent is extended or adjusted under 35 U.S.C. 154(b) by 0 days.

(21) Appl. No.: 14/993,964

(22) Filed: Jan. 12, 2016

(65) Prior Publication Data

US 2017/0199388 A1 Jul. 13, 2017

(51) Int. Cl.
*G02B 27/02* (2006.01)

(52) U.S. Cl.
CPC ......... *G02B 27/028* (2013.01); *G02B 27/022* (2013.01)

(58) Field of Classification Search
CPC .................................................. G02B 27/028
USPC .................................................. 359/630, 631
See application file for complete search history.

(56) References Cited

U.S. PATENT DOCUMENTS

| D750,074 S | 2/2016 | Coz et al. | |
|---|---|---|---|
| 9,420,075 B2 | 8/2016 | Buckley | |
| 2013/0194682 A1* | 8/2013 | Sahu | G02B 27/022 |
| | | | 359/804 |
| 2016/0195728 A1 | 7/2016 | Choi | |
| 2016/0259170 A1 | 9/2016 | Choi | |
| 2016/0349836 A1 | 12/2016 | Goossens et al. | |
| 2016/0370592 A1 | 12/2016 | Mak | |
| 2017/0108703 A1* | 4/2017 | Kong | G02B 27/2257 |

FOREIGN PATENT DOCUMENTS

| WO | WO 02/23519 | 3/2002 |
|---|---|---|
| WO | WO 2016/185410 | 11/2016 |

OTHER PUBLICATIONS

Carbotte, Kevin, "VR On The Go: Goggle Tech Go4D C1-Glass, Hands-On" (Jun. 10, 2015), accessed on Jul. 18, 2017, at: http://www.tomshardware.com/news/goggle-tech-go4d-cardboard-vr,29354.html.
Davies, Alex, "Google's Cardboard 2 VR Viewer Review And Hands-On With Jump Video," (May 31, 2015), accessed on Jul. 28, 2017, at: http://www.tomshardware.com/news/google-cardboard-2-vr-jump,29207.html.
"DAVYCI Pro Unboxing Review: Virtual Reality Google Cardboard I/O 3D VR Headset Glass", (Oct. 11, 2014), accessed on Jul. 18, 2017, at: https://www.youtube.com/watch?v=Y2are3EKQoU.

* cited by examiner

*Primary Examiner* — James Jones
(74) *Attorney, Agent, or Firm* — Barnes & Thornburg LLP

(57) ABSTRACT

A head-mountable viewer with adjustable lenses is disclosed herein. The head-mountable viewer may include a frame with a first and second bore therein, each bore receives a first and second lens, respectively. The frame may further include a first and second side arms that each have a first and second tab, respectively. The first and second tabs are operatively connected to or attached to the first and second lenses, such that movement or adjustment of the first or second tabs corresponds to movement or adjustment of the first or second lenses, respectively. In this regard, the adjustability of the first and second lenses provides a single head-mountable viewer to be universally used, that is, any user may use the same head-mountable viewer by being able to adjust the lenses to best suit his or her comfort.

8 Claims, 4 Drawing Sheets

HEAD-MOUNTABLE VIEWER WITH ADJUSTABLE LENS

BACKGROUND

Virtual reality continues to improve and develop in order to allow a user to immerse himself or herself into another world, whether real or imaginary. Virtual reality may take the form of a 3D graphic design on a screen, such as an arcade screen, or the user may wear a head-mounted display or viewer such that the screen is placed directly over the field of vision of the user. A piece of cardboard or plastic may be used as a head-mountable viewer such that the user can place an electronic device, such as a smartphone, into the cardboard and then fold the cardboard in such a way that the cardboard and electronic device alone provide the user with a virtual reality experience. Using cardboard, as one example, may be a cheaper alternative to expensive virtual reality devices, but nonetheless the cardboard used may not be suitable and conformable to the many different shapes and sizes of the vast array of users.

SUMMARY

A head-mountable viewer with adjustable lenses to suit the needs of users is disclosed herein. The head-mountable viewer may be made of cardboard, which then folds in a manner that houses the electronic device that is securely placed therein, and a display of the electronic device is directed toward a face of a user such that the user can immerse himself or herself in the virtual reality world. The head-mountable viewer includes a pair of lenses that the user looks through to see the electronic device when the user places the head-mountable viewer up against his or her face. The lenses may be attached to a set of tabs that are located around a periphery of the head-mountable viewer. Movement and manipulation of the tabs allows the user to manipulate and position the lenses to conform to the facial features and preferences of the user, e.g., position the lenses comfortably in front of the eyes of the user.

A head-mountable viewer is disclosed herein, the head-mountable viewer including a frame having a cavity, the cavity configured to receive an electronic device, the frame further including a bore; a first lens positioned within the bore; and a first tab attached to the frame, wherein the first tab is operatively connected to the first lens and movement of the first tab causes a corresponding movement of the first lens.

As another example, vertical, horizontal, diagonal, or lateral movement of the first tab causes vertical, horizontal, diagonal, or lateral movement of the first lens, respectively. As a further example, the head-mountable viewer further includes a first side arm extending from a first side of the frame, the first side arm including the first tab; and a second side arm extending from a second side of the frame, the first side arm including a second tab, wherein the second tab is operatively connected to a second lens positioned within a second bore within the frame, and movement of the second tab causes a corresponding movement of the second lens. As another example, lateral movement of first tab causes lateral movement of the first lens relative to a face of a user.

As another embodiment, a head-mountable viewer is disclosed, wherein the head-mountable viewer includes a frame; and a slidable member, the slidable member operatively connected to a first tab and the slidable member further operatively connected to a first lens, the first tab extending from a cut-out of the frame and the first lens being aligned with a first bore within the frame, wherein adjustment of the first tab translates to adjustment of the first lens within the periphery of the first bore. As another example, the head-mountable includes a first side arm of the frame, the first side arm positioned in a horizontal direction of the first lens, wherein the first tab extends from the first side arm. As another example, the outward positioning of the first tab away from the frame translates to outward positioning of the first lens away from a central portion of the frame, and inward positioning of the first tab toward the frame translates to inward positioning of the first lens toward the central portion of the frame. In another example, the first tab and first lens are positionable at any location between a fully extended first tab and a fully inserted first tab. As a further example, vertical, horizontal, diagonal, or lateral movement of the first tab causes vertical, horizontal, diagonal, or lateral movement of the first lens, respectively. In that example, the slidable member includes a recess that receives the first lens.

DETAILED DESCRIPTION

The aspects, features and advantages of the present disclosure will be appreciated when considered with reference to the following description of preferred embodiments and accompanying figures. The following description does not limit the disclosure; rather, the scope is defined by the appended claims and equivalents. While certain processes in accordance with example embodiments are shown in the figures as occurring in a linear fashion, this is not a requirement unless expressly stated herein. Different processes may be performed in a different order or concurrently.

The present disclosure describes a head-mountable viewer with adjustable lenses. The head-mountable viewer may include a frame with a cavity therein, wherein the cavity is configured to receive an electronic device with a display, such as a smartphone. The frame will also include a first and second bore with a first and second lens securely placed therein. The frame may further include first and second tabs that are operatively connected or attached to the first and second lenses, respectively, and thereby movement of the first and second tabs cause a corresponding movement of the first and second lenses, respectively. In this regard, when the frame is held up to the face of the user, the user is able to adjust the lenses accordingly in a manner that best suits their facial features.

Figure 1:
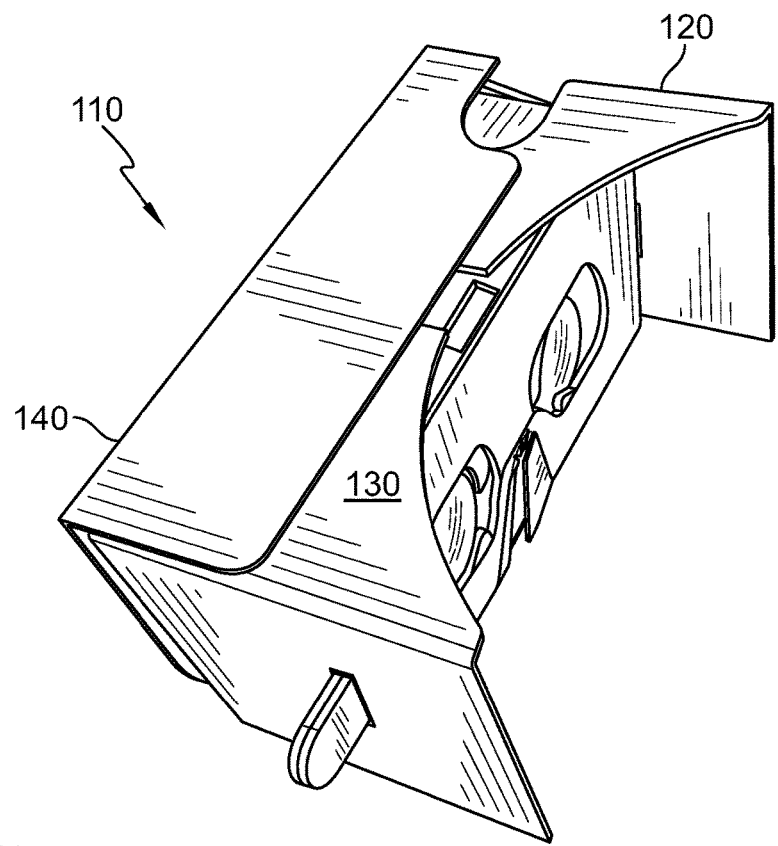
FIG. 1 is an overview of the head-mountable viewer in accordance with aspects of the disclosure.
Figure 2:
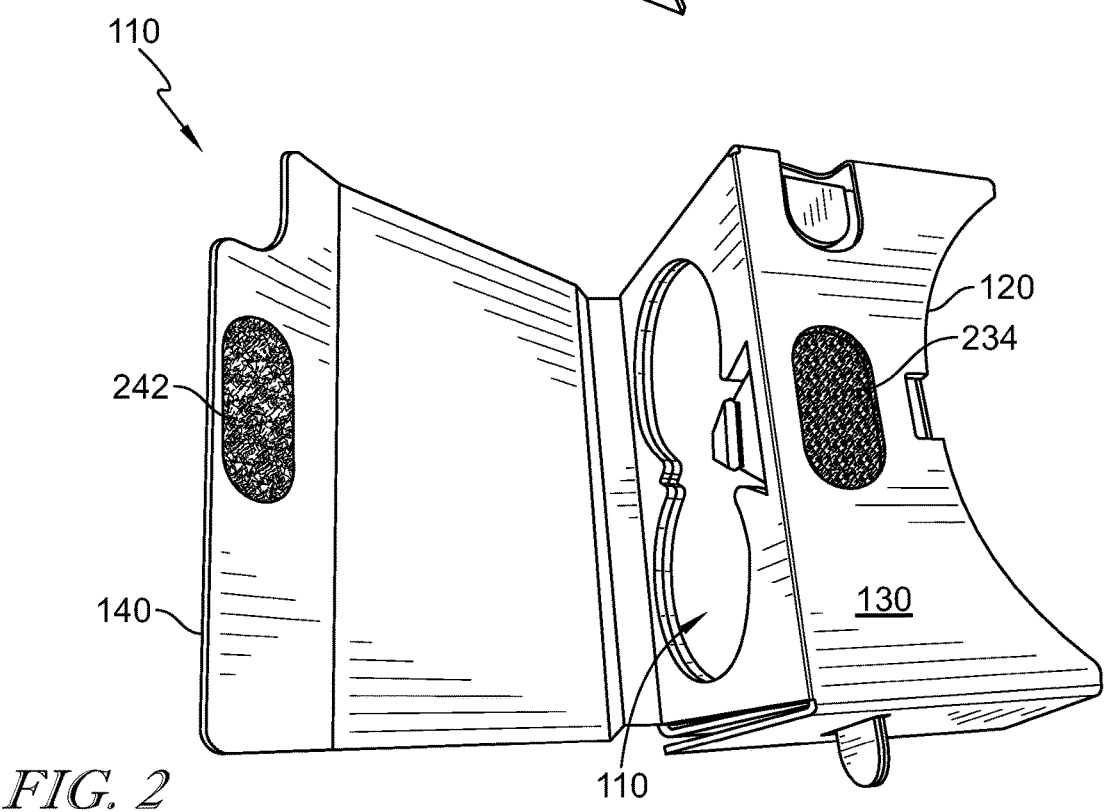
FIG. 2 illustrates a cavity of the head-mountable viewer in accordance with aspects of the disclosure.

Referring to FIG. 1, head-mountable viewer 110 includes a frame 120 configured to be held to the face of the user. Frame 120 may be made of cardboard, plastic, or any such material with sufficient substance to operate as a head-mountable viewer in accordance with the disclosure herein. The frame 120 includes a base 130 and a backing 140 that the user can detach and then re-attach to each other. For instance, frame 120 may implement a fastening mechanism to fasten backing 140 to base 130. In this regard and as illustrated in FIG. 2, frame 120 implements Velcro™ to fasten backing 140 to base 130. In particular, backing 140 includes soft-side 242 and base 130 includes hard-side 234 that fasten to each other. This provides the user with an easy way to attach and re-attach backing 140 to base 130. As alternative examples to fasten backing 140 to base 130, a hook and loop fastener, tab and notch fastener, other types of touch fasteners, or any other fastener may be used as well.

As illustrated in FIG. 2, the opening of backing 140 from base 130 exposes cavity 236 within base 130. Cavity 236 is provided to allow an electronic device to be inserted therein. The electronic device may include a smartphone, PDA, or any video game system that includes a display. It should be noted that although a smartphone may be used, any electronic device that includes processing capabilities may be implemented as well. For instance, the processing capabilities of the electronic device may include a processor, memory with instructions and data stored therein, and a display.

The memory of the electronic device stores information accessible by the processor including instructions and data that may be executed or otherwise used by the processor. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein.

The data may be retrieved, stored or modified by the processor in accordance with the instructions. For instance, although the system and method is not limited by any particular data structure, the data may be stored in computer registers, in a relational database as a table having a plurality of different fields and records, XML documents or flat files. The data may also be formatted in any computer-readable format.

The processor may be any conventional processor, such as commercially available CPUs. Alternatively, the processor may be a dedicated device such as an ASIC. Although the electronic device may store the processor and memory within the same physical housing of the electronic device, it will be understood that the processor and memory may actually comprise multiple processors and memories that may or may not be stored within the same physical housing. For example, memory may be a hard drive or other storage media located in a housing different from that of computer 110. For instance, the processor or memory may operate remotely from the electronic device and communicate wirelessly.

Once the electronic device is inserted into cavity 236, backing 140 may be re-attached to base 130 using the fasteners 242 and 234 as described above.

Figure 3:
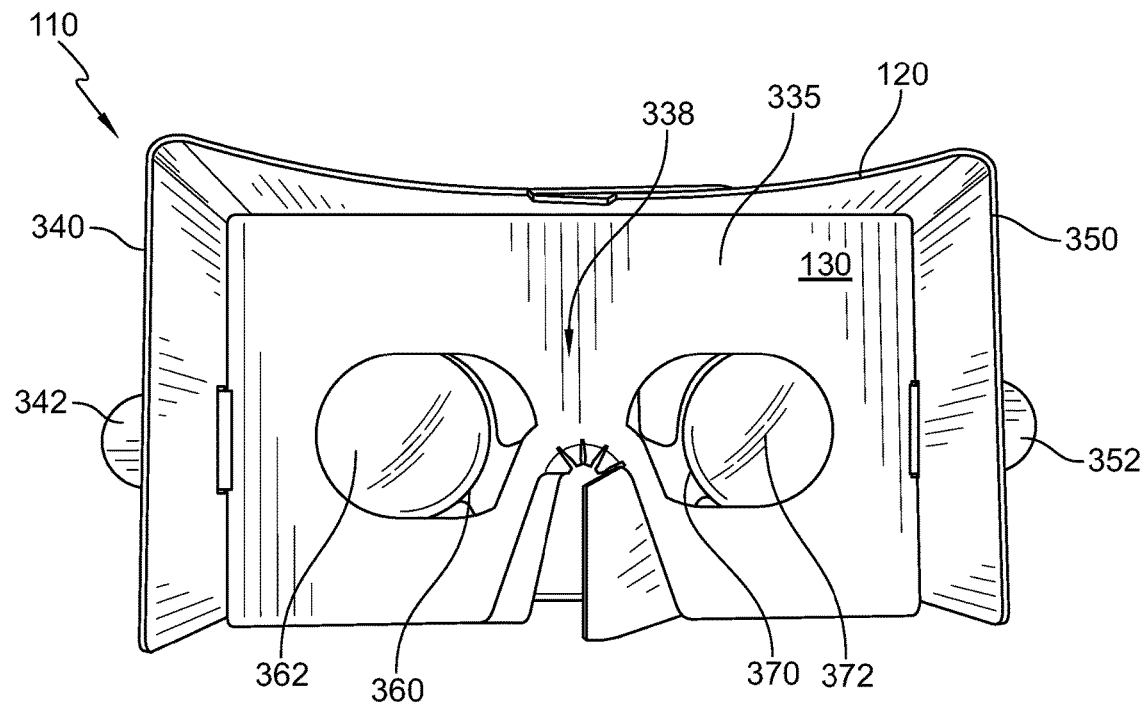
FIG. 3 depicts the first and second lenses positioned away from a central portion of the head-mountable viewer in accordance with aspects of the disclosure.

FIG. 3 illustrates a front portion 335 of head-mountable viewer 110 that the user would place up against his or her face. FIG. 3 further shows first side arm 340 and second side arm 350, both side arms of which having a first tab 342 and a second tab 352 extending therefrom, respectively. For instance, first tab 342 and second tab 352 extend from cut-outs in first side arm 340 and second side arm 350. It should understood that although first and second tabs 342 and 352 extend from first and second sidearms 340 and 350, the first and second tabs may extend from any part of frame 120. For instance, first and second tabs 342 and 352 may extend from any position on a top, bottom, corner, back, or front portion of frame 120.

Front portion 335 of base 130 includes a first bore 360 and a second bore 370, both bores of which have a first lens 362 and a second lens 372, respectively, securely placed therein. The first and second lenses 362 and 372 may be fastened to base 120 through bores 360 and 370 via various fastening means. For example, first and second lenses 362 and 372 may be fastened via glue, a tab and notch mechanism, tape, staple, button, clasp, clamp, or clip. Any number of ways may be included to fasten first and second lenses 362 and 372 to frame 120 within first and second bores 360 and 370. It should be noted that although the description and figures herein describe head-mountable viewer 110 as having two bores and two lenses, the head-mountable viewer 110 is not restricted thereto. For example, head-mountable viewer 110 may include only a single bore with a single lens secured placed therein. Alternatively, any number of bores and lenses may be implemented, such as three, four, etc.

Figure 4:
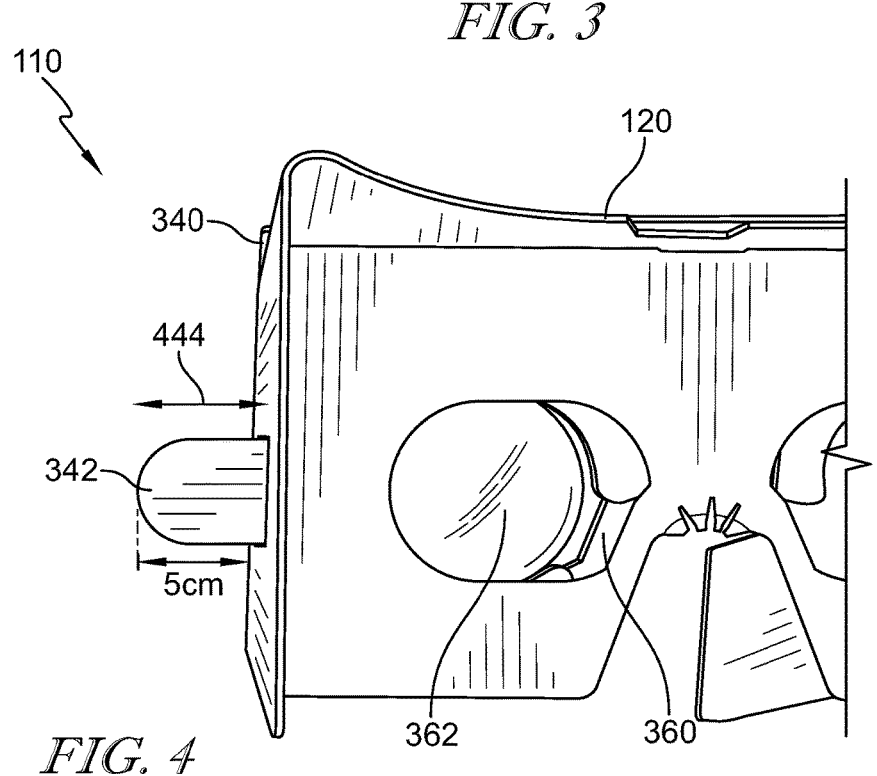
FIG. 4 depicts an outward positioning of the first tab in accordance with the positioning of the first lens shown in FIG. 3 in accordance with aspects of the disclosure.

First and second lenses 362 and 372 are adjustable relative to frame 120. In this regard, first tab 342 may be operatively connected or attached to first lens 362 and second tab 352 may be operatively connected or attached to second lens 372. For instance, FIGS. 3 and 4 illustrate first tab 342 pulled outward relative to frame 120, which in turn adjusted a position of first lens 362 within a outer periphery of bore 360. Arrow 444 of FIG. 4 illustrates the directional movement of first tab 342.

Figure 5:
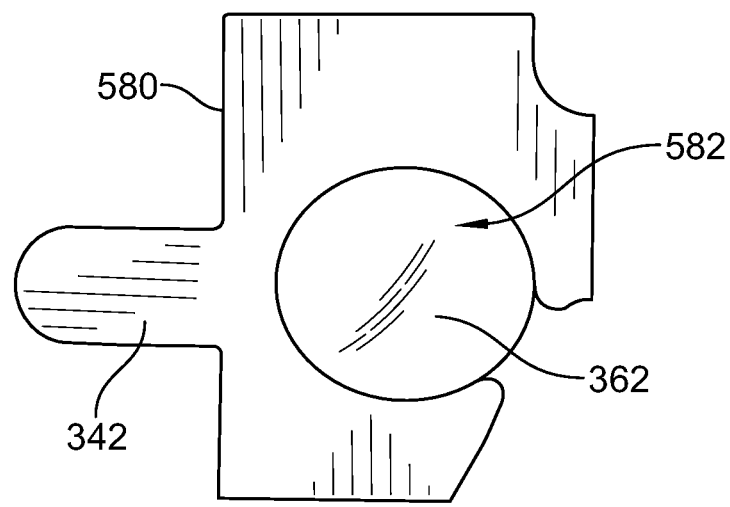
FIG. 5 illustrates a slidable member in accordance with aspects of the disclosure.

Referring to FIG. 5, first tab 342 may be attached to a single slidable member 580 that first lens 362 is also attached to. Slidable member 580 may slide horizontally based on the preference of the user. In this regard, since first tab 342 and first lens 362 are attached to the slidable member 580, this results in the corresponding or translatable movement between first tab 342 and first lens 362. It should be noted that the positioning of first lens 362 is such that the positioning of first lens 342 corresponds to bore 360. Slidable member 580 includes a recess 582 that receives first lens 362. In this regard, first lens 362 may be attached to recess 582 via any fastening means, such as glue, tab and notch, staples, Velcro™, or any other method of securing first lens 362 to slidable member 580, with or without recess 582. Recess 582 may alternatively be defined as a cut-out within slidable member 580 to receive first lens 352.

It should be understood that although slidable member 580 is illustrated as a single component, there may be multiple components that operatively connect first tab 342 with first lens 362. For instance, first tab 342 may be attached or fastened to an extension that is connected to a lens component that securely receives and fastens to first lens 362. Alternatively, the extension may be directly connected to first lens 362. In this regard, the extension causes any movement or adjustment of first tab 342 to translate to first lens 362. As a further alternative, slidable member 580 may not be employed; rather, first lens 362 may only be secured to frame 120 within first bore 360 and first tab 342 may be operatively connected or attached to first lens 362. In this scenario, any movement or adjustment of first tab 342 may cause a corresponding movement or adjustment of first lens 362, whether slidable member 580 is employed or not.

It is understood that the components of first side arm 340, first tab 342 and slidable member 580 also apply to second side arm 350, second tab 352 and the corresponding slidable member for the second lens 372 as well. In this regard, both lenses and sides of the head-mountable viewer may be identical and/or symmetrical in that they include, utilize, or operate similarly using the same or similar components. Alternatively, the internal components and operations of both sides may be different.

Figure 6:
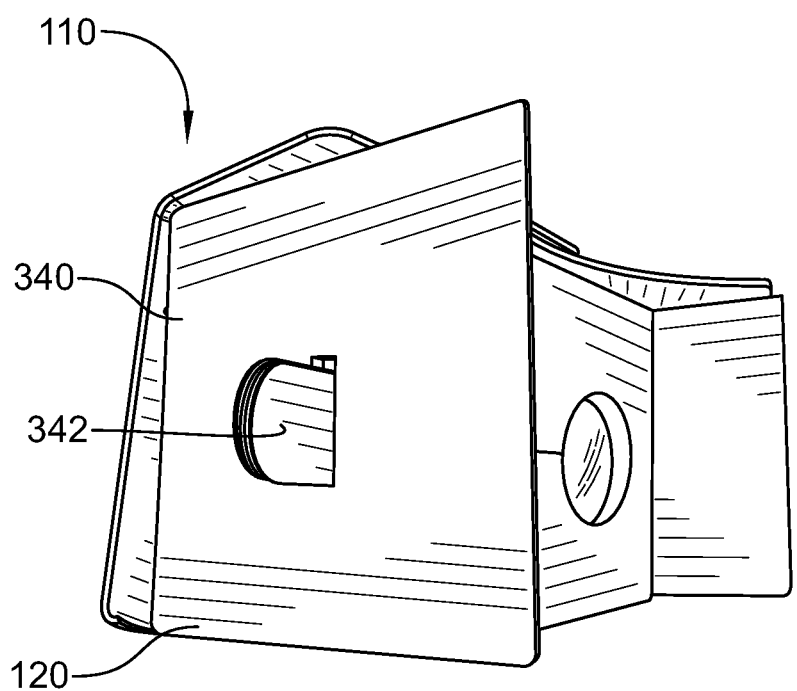
FIG. 6 depicts a close-up view of the first side arm and first tab in accordance with aspects of the disclosure.

Referring back to FIG. 4, first tab 342 is fully extended, which in turn positioned first lens 362 away from a central portion 338 of frame 120. For example, FIGS. 3 and 4 illustrate first lens 362 positioned at a location of first bore 360 closer to first side arm 340. In this regard, by first tab 342 being pulled by the user away from frame 120, slidable member 580 correspondingly moves or translates the positioning of first lens 362, relative to first bore 360. As illustrated in FIG. 4 and by way of example only, first tab 342 is extended 5 centimeters (cm) from a surface of first side arm 340. It should be noted that 5 cm is an example, and any extendable length of first tab 342 is possible and may depend on, for example, the individual manufacturer's specifications or wishes. FIG. 6 is a close-up view of first side arm 340 and first tab 342.

In addition, FIG. 3 illustrates second tab 352 pulled outward relative to frame 120, which in turn adjusts the positioning of second lens 372 relative to second bore 370. For instance, second lens 372 has also been positioned away from central portion 338 of frame 120 toward second side arm 350. In this regard, first tab 342 affects the positioning of first lens 362 and second tab 352 affects the positioning of second lens 372. First and second tabs 342 and 352 operate and control first and second lenses 362 and 372 independently of each other. For instance, first tab 342 may be fully extended while second tab 352 is extended half-way, fully inserted, etc.

Figure 7:
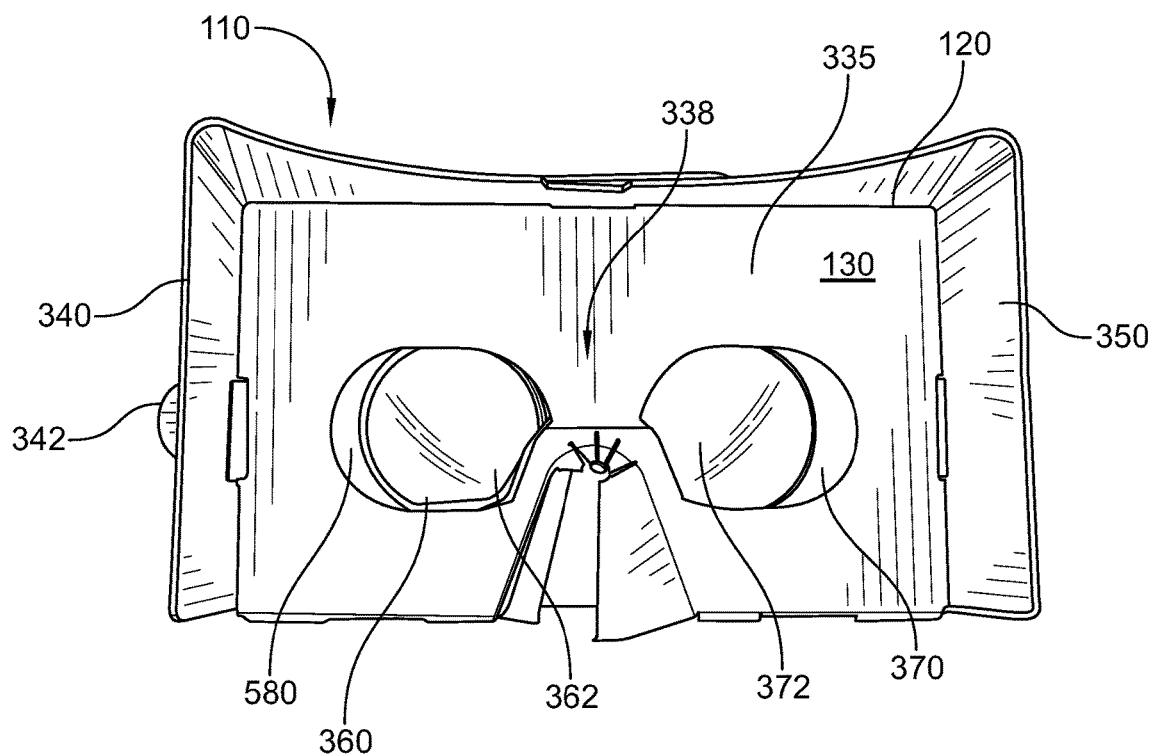
FIG. 7 depicts the first and second lenses positioned toward the central portion of the head-mountable viewer in accordance with aspects of the disclosure.
Figure 8:
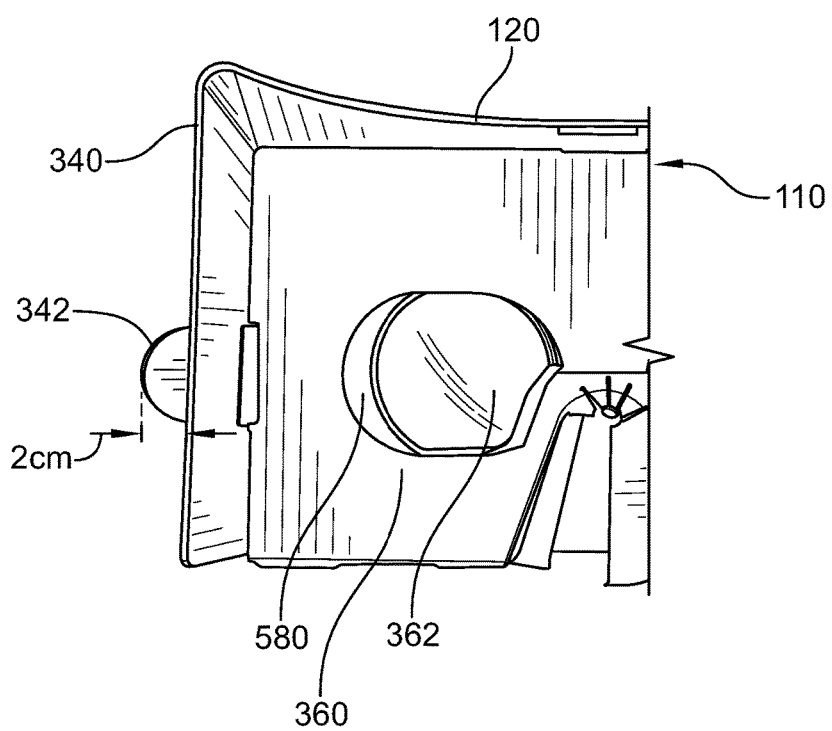
FIG. 8 depicts an inward positioning of the first tab in accordance with the positioning of the first lens shown in FIG. 7 in accordance with aspects of the disclosure.

Referring to FIGS. 7 and 8, first and second tabs 342 and 352 have been re-adjusted to adjust the positioning of first and second lenses 362 and 372. First and second lenses 362 and 372 are now positioned inward toward central portion 338 of frame 120. As shown in FIG. 8, first tab 342 has been pushed inward toward frame 120 compared to the pulled-away tab of FIG. 4. By way of example only, FIG. 8 illustrates that first tab 342 has been pushed inward so that only 2 cm of first tab 342 is exposed, which thereby adjusted first lens 362 to be positioned inward relative to first bore 360 toward central portion 338. It should be understood that first and second tabs 342 and 352 may be adjusted (e.g., pushed and pulled) at any position between fully pushed inward and fully pulled outward. For instance, although the figures depict first and second tabs 342 and 352 being fully pushed in (2 cm of the tabs exposed) and fully pulled out (5 cm of the tabs exposed), first and second tabs 342 and 352 may be positioned such that 3 cm are exposed, 4 cm are exposed, and any distance between 2 and 5 cm.

As discussed above, the distances of 2 cm and 5 cm are examples only, and first and second tabs 342 and 352 are not restricted thereto. For instance, first and second tabs 342 and 352 may be pulled and pushed at any distance depending on the preference of the manufacturer. As one example, a fully pushed in first tab 342 may be completely even with a base surface of first side arm 340, which in turn would position first lens 362 nearer to central portion 338. As another example, a fully extended first tab 342 may expose, for example, 10 cm of first tab 342. Other distances and exposures of first and second tabs 342 and 352 are also possible.

By the user being able to adjust the positioning of first and second lenses 362 and 372, every individual user may position the lenses in front of his or her eyes that is most comfortable and suitable for himself or herself. For instance, this permits a manufacturer to be able to produce a single product for all users because each user is able to adjust the lenses to their liking. Because many users may have different distances between their eyes, such as in different interpupillary distances, the ability to adjust the lenses in a manner that best suits him or her makes viewing easier and more enjoyable. Furthermore, the manufacturer does not need to produce several different sizes of head-mountable viewers to fit the needs of all sizes and shapes of users. As a further example, younger individuals, such as children, may have smaller sized and shaped faces than an adolescent, and an adult may likewise have a different sized and shaped face than a child or an adolescent. In this regard, not only can the same head-mountable viewer be used for all ages, but as the individual grows up the same head-mountable viewer may be used since the user can adjust the positioning of the lenses accordingly.

As another embodiment, a single bar may be used that is operatively attached to the first and second lenses. For instance, instead of first tab 342 individually affecting the position of first lens 362 and second tab 352 individually affecting the position of second lens 372, a single bar or tab may be used that is operatively connected or attached to both the first and second lenses. In this regard, a first end of the single bar may extend out of the first side arm 340 and the second end may extend out of the second side arm 350. In this scenario, the user may push or pull the first end or the second end of the single bar to adjust the positioning of the first and second lenses. Since the single bar is operatively attached to both lenses, the single bar affects the positioning of both lenses relative to the bores. Alternatively, only one of the first or second ends may extend out of the first or second side arms. In this scenario, the user may only push, pull, or otherwise adjust the extending end to adjust the positioning of the single bar and thereby the positioning of the first and second lenses. As discussed above, the single bar may adjust any number of lenses, such as only a single lens, three lenses, or any number of multiple lenses. As discussed above with respect to first and second tabs 342 and 352, the single bar may extend from any part of frame 120, such as a top, bottom, corner, front, or back portion of frame 120.

In another embodiment, the tabs may affect any directional movement and adjustability of the lenses. For instance, the tabs may move in vertical, diagonal, lateral, or any directional movement, and thereby adjust the positioning of lenses accordingly. For instance, vertical movement of the tabs may adjust the lenses in a vertical direction as well. Diagonal movement of the tabs may allow the user to adjust the lenses in a diagonal direction that is best suited for him or her. As another example, if the user feels the lenses are too close or far from his or her face, the user may adjust the tabs in a lateral direction such that the tabs move closer or further from the face of the user. In this scenario, the lenses may move according to the lateral (i.e., closer and farther) movement of the tabs. The numerous directions that the tabs can adjust the lenses in may also apply to the single bar that controls multiple lenses discussed above. For instance, the single bar that is operatively attached to multiple lenses may also move in vertical, diagonal, lateral and any other directional movement.

As another embodiment, additional tabs may be used to adjust additional components of head-mountable viewer 110. For instance, a frame tab may be implemented similarly as discussed above with respect to first and second tabs 342 and 352, but frame tab may adjust a portion of frame 120 itself. As one example, a nose tab that adjusts the size and/or positioning of the nose cut-out. In this regard, the sides of the nose cut-out may contract or expand based on the preference of the individual user. In this regard, because some users may have larger noses than others, the user is able to adjust the size thereof.

As another example, a side arm tab may be implemented. In this scenario, the side arm tab may adjust the positioning of the first and second side arms of the frame 120. For instance, the side arm tab may be attached to and adjust the side arms similarly as the first and second tabs 342 and 352 described above with respect to the first and second lenses 362 and 372. For example, the side arm tab may adjust or re-position the first and second side arms vertically, horizontally, diagonally, laterally relative to the face of the user, or any other direction. The side arm tab may adjust multiple side arms or the frame 120 may include multiple side arm tabs in which each side arm tab controls an individual side arm. In this regard, because many users have different sized and shaped heads, the ability to be able to adjust the positioning of the side arms allows the user to better utilize the side arms to block the outside world that the user may see from his or her periphery vision.

As a further example, a frontal tab may be implemented that adjusts the central base 130 of frame 120. For instance, referring to the figures, the frontal tab may adjust the positioning of the area surrounding lenses 362 and 372, not including first and second side arms 340 and 350. For example, the user may want to adjust the frontal portion laterally. As one scenario, if the user wears glasses then the user may want the frontal portion to be pushed in a direction away from the face of the user, this way the first and second side arms 340 and 350 are still covering the periphery vision of the user and the head-mountable viewer may conform better to the face of the user. Alternatively, if the user does not wear glasses then the user may want the frontal portion to be closer to the face of the user to better fit the user.

The present disclosure is advantageous because it allows any user to adjust a particular head-mountable viewer to their liking. Because many people of different ages may have different sized and shaped heads and faces, the ability to adjust components of the head-mountable viewer allows the user to comfortably and easily view virtual reality videos, games, etc. in a manner most fitted for them. Furthermore, because many users have different interpupillary distances the adjustability of the lenses allows for a more enjoyable experience for each unique user. In addition, as described above the user is not only able to adjust lenses that best suits their needs, but the user may also adjust side arms, a nose cut-out, frontal portions of the frame, and any other conceivable component of the frame of the head-mountable viewer that best fits their needs. This not only allows comfortable viewing, but it also allows the user to utilize the side arms so that the side arms reliably block out the surroundings that may result from the periphery vision of the user. The ability to adjust various components also allows users with glasses to adjust accordingly.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A head-mountable viewer, comprising:
   a frame having a cavity, the cavity configured to receive an electronic device, the frame further including a bore;
   a first lens positioned within the bore;
   a first tab attached to the frame, wherein the first tab is operatively connected to the first lens and movement of the first tab causes a corresponding movement of the first lens; and
   a first side arm extending from a first side of the frame, the first side arm including the first tab; and
   a second side arm extending from a second side of the frame, the second side arm including a second tab, wherein the second tab is operatively connected to a second lens positioned within a second bore within the frame, and movement of the second tab causes a corresponding movement of the second lens.

2. The head-mountable viewer of claim 1, wherein vertical, horizontal, diagonal, or lateral movement of the first tab causes vertical, horizontal, diagonal, or lateral movement of the first lens, respectively.

3. The head-mountable viewer of claim 1, wherein lateral movement of first tab causes lateral movement of the first lens relative to a face of a user.

4. A head-mountable viewer, comprising:
   a frame;
   a slidable member, the slidable member operatively connected to a first tab and the slidable member further operatively connected to a first lens, the first tab extending from a cut-out of the frame and the first lens being aligned with a first bore within the frame, wherein adjustment of the first tab translates to adjustment of the first lens within the periphery of the first bore; and
   a first side arm of the frame, the first side arm positioned in a horizontal direction of the first lens, wherein the first tab extends from the first side arm.

5. A head-mountable viewer, comprising:
   a frame;
   a slidable member, the slidable member operatively connected to a first tab and the slidable member further operatively connected to a first lens, the first tab extending from a cut-out of the frame and the first lens being aligned with a first bore within the frame, wherein adjustment of the first tab translates to adjustment of the first lens within the periphery of the first bore,
   wherein outward positioning of the first tab away from the frame translates to outward positioning of the first lens away from a central portion of the frame, and inward positioning of the first tab toward the frame translates to inward positioning of the first lens toward the central portion of the frame.

6. The head-mountable viewer of claim 5, wherein the first tab and first lens are positionable at any location between a fully extended first tab and a fully inserted first tab.

7. The head-mountable viewer of claim 4, wherein vertical, horizontal, diagonal, or lateral movement of the first tab causes vertical, horizontal, diagonal, or lateral movement of the first lens, respectively.

8. The head-mountable viewer of claim 4, wherein the slidable member includes a recess that receives the first lens.

\* \* \* \* \*